United States Patent [19]
Young

[11] Patent Number: 5,236,390
[45] Date of Patent: Aug. 17, 1993

[54] ENTRYWAY SYSTEM FOR MOBILE MEDICAL UNIT

[75] Inventor: Craig A. Young, Geneva, N.Y.

[73] Assignee: Theradynamics Corporation, Geneva, N.Y.

[21] Appl. No.: 736,512

[22] Filed: Jul. 26, 1991

[51] Int. Cl.⁵ .............................................. A61G 3/00
[52] U.S. Cl. .................................... 454/95; 296/19; 296/24.1; 454/143
[58] Field of Search ................... 296/19, 24.1, 166; 454/70, 75, 87, 95, 143, 195

[56] References Cited

U.S. PATENT DOCUMENTS

| | | | |
|---|---|---|---|
| 2,370,402 | 2/1945 | Gutman | 296/19 |
| 2,464,923 | 3/1949 | Davis | 296/24.1 |
| 3,509,810 | 5/1970 | Riester | 454/70 |
| 3,567,273 | 3/1971 | Haas | 296/24.1 |
| 4,181,347 | 1/1980 | Clark . | |
| 4,550,946 | 11/1985 | Hanemaayer | 296/24.1 X |
| 4,570,733 | 2/1986 | Star | 180/41 |
| 4,581,986 | 4/1986 | Conklin . | |
| 4,842,224 | 6/1989 | Cohen | 244/159 |
| 4,858,256 | 8/1989 | Shankman | 4/597 |
| 4,915,435 | 4/1990 | Levine | 296/24.1 |

FOREIGN PATENT DOCUMENTS

| | | |
|---|---|---|
| 0219469 | 4/1987 | European Pat. Off. . |
| 1178550 | 9/1964 | Fed. Rep. of Germany . |
| 2421693 | 11/1975 | Fed. Rep. of Germany ........ 296/19 |
| 1366174 | 6/1964 | France .............................. 296/24.1 |
| 602756 | 3/1960 | Italy ................................. 246/24.1 |
| 1049235 | 11/1966 | United Kingdom ............... 296/24.1 |

Primary Examiner—Harold Joyce
Attorney, Agent, or Firm—Eugene Stephens & Associates

[57] ABSTRACT

A mobile medical unit (10) has interior space divided into a service compartment (24), a treatment compartment (26), an entryway compartment (28), and a storage compartment (30). An interior door (52) controls passage of persons between the entryway compartment (28) and the treatment compartment (26), an exterior door (58) controls passage of persons between the entryway compartment (28) and space outside of the medical unit (10), and an opening (64) is formed between the entryway compartment (28) and the storage compartment (30) for retrieval and replenishment of supplies. The interior door (52) and the exterior door (58) form between them an air lock to help maintain an aseptic condition within the treatment compartment (26). However, the interior door (52) is oriented at an acute angle with respect to the exterior door (58) to provide an auxiliary exit for recumbent patients along a smooth curved passageway (94).

31 Claims, 4 Drawing Sheets

ENTRYWAY SYSTEM FOR MOBILE MEDICAL UNIT

FIELD OF THE INVENTION

The invention relates to health care facilities that are transportable for administering medical services at locations remote from hospitals and, more particularly, to such facilities that are constructed as self-contained units capable of rapid deployment.

BACKGROUND

Survival rates of injured at sites of major accidents, warfare, and natural disasters can be substantially increased by rapid therapeutic intervention. When the site of medical emergency is near a hospital, the injured can be transported by ambulances or other carriers to the hospital. However, when the medical emergency takes place at a site far from a hospital or when appropriate transportation is not available, the increased survival rates depend upon therapeutic capabilities that can be established at the site.

Knock-down hospital facilities that are transported in parts must be set up on site, and this wastes considerable time that is needed for providing emergency medical services. In contrast, self-contained mobile hospital units are capable of dispensing immediate medical care upon arrival at the site. One such hospital unit is disclosed in U.S. Pat. No. 4,570,733 to Star. The unit is made from a cargo container that is reconstructed into a self-contained hospital for deployment by either aircraft or surface transports.

Mobile medical units have a limited treatment space that should be maintained in an aseptic condition. However, the sites of medical emergencies are sometimes contaminated with biological or chemical agents that can be transported into the treatment space on patients, medical personnel, and supplies. Although it would be possible to set up separate decontamination facilities on site with the mobile medical units, the additional facilities would greatly complicate and possibly delay deployment of the medical units.

Large amounts of medical supplies including medical gases are needed to sustain remote operation of the medical units. The supplies and gas tanks should be stored in locations that are separately accessible from inside and outside the medical units. Openings for retrieving and replenishing the supplies should be as large as possible so that adjacent supplies are not disturbed. However, covers or doors for closing the openings should be as small as possible to conserve interior wall space and to limit exposure of the supplies to exterior contaminants.

SUMMARY OF INVENTION

The invention is an entryway system for mobile medical units. The system is specially configured to support several different functions. For example, the system includes an entryway compartment that can function as both an air lock and a decontamination site. A closet for storing tanks of expendable medical gases or other supplies is accessible from the entryway compartment. In addition, the compartment is arranged to provide an auxiliary exit for recumbent patients.

The entryway compartment is located between two doors. One of the doors is an exterior door that controls a passageway for persons between the entryway compartment and space outside of the unit. The other door is an interior door that controls passage of persons between the entryway compartment and a treatment space within the medical unit. The exterior and interior doors can be opened and closed independently of each other for isolating the treatment space from the space outside of the unit, or both doors can be opened simultaneously to permit passage of a patient on a litter between the two spaces.

The entryway compartment is preferably sized between the exterior and interior doors to hold two persons; e.g., a patient and a medical aide. An air-handling system can be used to remove biological or chemical contaminations from the entryway compartment prior to opening the interior door to the treatment space. One wall of the entryway compartment can be used to mount a sink, and the entire compartment can also be used as a shower stall to wash contaminants from persons and supplies. A floor of the entryway compartment can be lowered with respect to a floor of the treatment space forming a stepwell with a valve-operated drain to collect contaminants suspended in the wash. Of course, the stepwell also includes a stair to assist a change of elevation between the floor of the treatment space and the ground outside of the unit.

A large opening is formed between the entryway compartment and the storage closet for retrieving and replenishing supplies, such as medical gases, without requiring entry into the treatment space. The closet is accessible from outside the unit through the exterior door of the entryway compartment, and the closet is accessible from the treatment space through the interior door. Thus, the exchange of supplies can be made within the protected confines of the entryway compartment. However, a smaller opening can be formed for connecting the treatment space with the storage closet to provide separate access to the supplies, including gas shut-off valves, from the treatment space.

The interior door is preferably a double-acting door having a main door leaf within which a door hatch is carried. The double-acting door can be swung between two positions, one of which closes the passageway between the entryway compartment and the treatment space, and the other of which closes the opening between the entryway compartment and the storage closet. In either position, the double-acting door separates the treatment space from the storage closet. The door hatch is used for routine passage between the entryway compartment and the treatment space, but the main door leaf can also be swung to the other position for facilitating passage of recumbent patients through both the interior and exterior doors.

Both of the doors are, of course, mounted within respective doorways. However, the interior doorway is preferably oriented at an acute angle with respect to the exterior doorway. The angular orientation of the interior doorway provides a smooth passageway for recumbent patients between the treatment space and the space outside of the unit. The opening formed between entryway compartment and the storage closet is made in a wall opposite from the acute angle to maximize width of the opening and to provide better access to the supplies stored in the closet.

DRAWINGS

DETAILED DESCRIPTION

Figure 1:
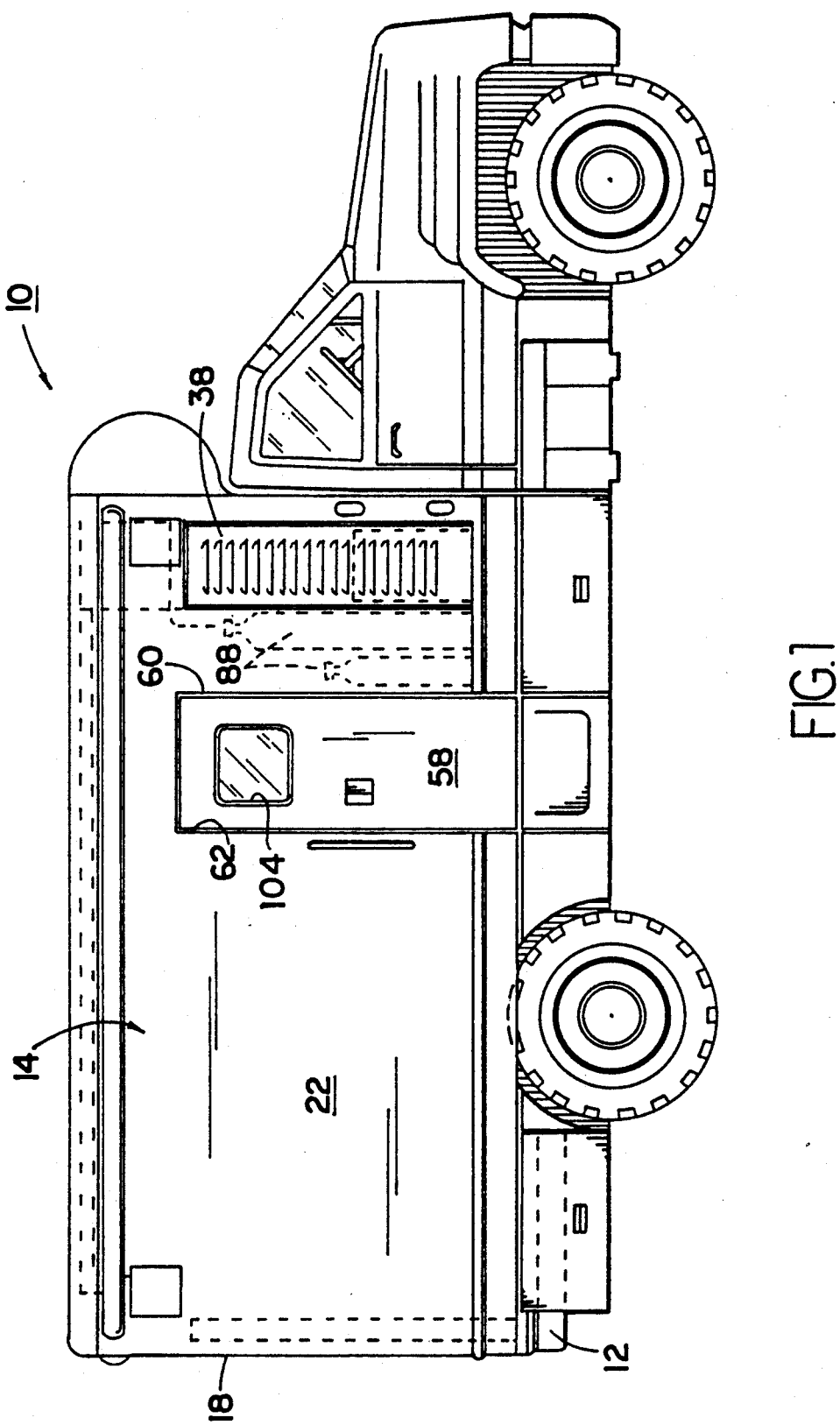
FIG. 1 is a side view of a mobile medical unit mounted on a truck chassis and having an exterior side door positioned in accordance with the invention.

One embodiment of the invention is illustrated in the drawing figures as part of a mobile medical unit 10 that is mounted on a truck chassis 12. However, the medical unit 10 is also intended to be detachable from the truck chassis 12 and supportable on jacks above the ground. In addition, the medical unit 10 is sized for transport by cargo aircraft and includes roof-mounted eyelets (not shown) for deployment by helicopter. The width of the medical unit 10 is preferably no greater than 102 inches or 260 centimeters.

The medical unit includes a main body 14 enclosed by front and rear walls 16 and 18 and two side walls 20 and 22. The main body 14 is divided into a service compartment 24, a treatment compartment 26, an entryway compartment 28, and a storage compartment 30. The service compartment 24 has space for respective pairs of generators 32 and 33 and air-handling units 34 and 35. Although referred to as separate air-handling units, the units 34 and 35 can be alternatively considered as separate controls of the same air-handling system. A partition (or wall) 36 separates the service compartment 24 from the treatment compartment 26 and storage compartment 30. A louvered panel 38 provides a vent for the generators 32, 33 and air-handling units 34, 35 through the side wall 22.

The treatment compartment 26 includes space for at least one gurney 40, and an exam light 42 is positioned overhead. Mounted within the treatment compartment 26 against portions of the two side walls 20 and 22 and partition 36 are: cabinets 44 that house medical equipment and supplies, medical machines 46 that support surgical operations, and a sink 48. Although not shown, connections for medical gases can be made along the side walls 20 and 22.

The entryway compartment 28 and storage compartment 30 are separated from the treatment space by a partition 50. An interior door 52 is hung on hinges 54 within a doorway 56 that is formed in the partition 50 between the treatment compartment 26 and entryway compartment 28. An exterior door 58, which separates the entryway compartment 28 from space outside of the medical unit 10, is hung on hinges 60 within an exterior doorway 62 formed in the side wall 22. Between the two doors 52 and 58, the entryway compartment 28 is sized to hold two persons.

Figure 2:
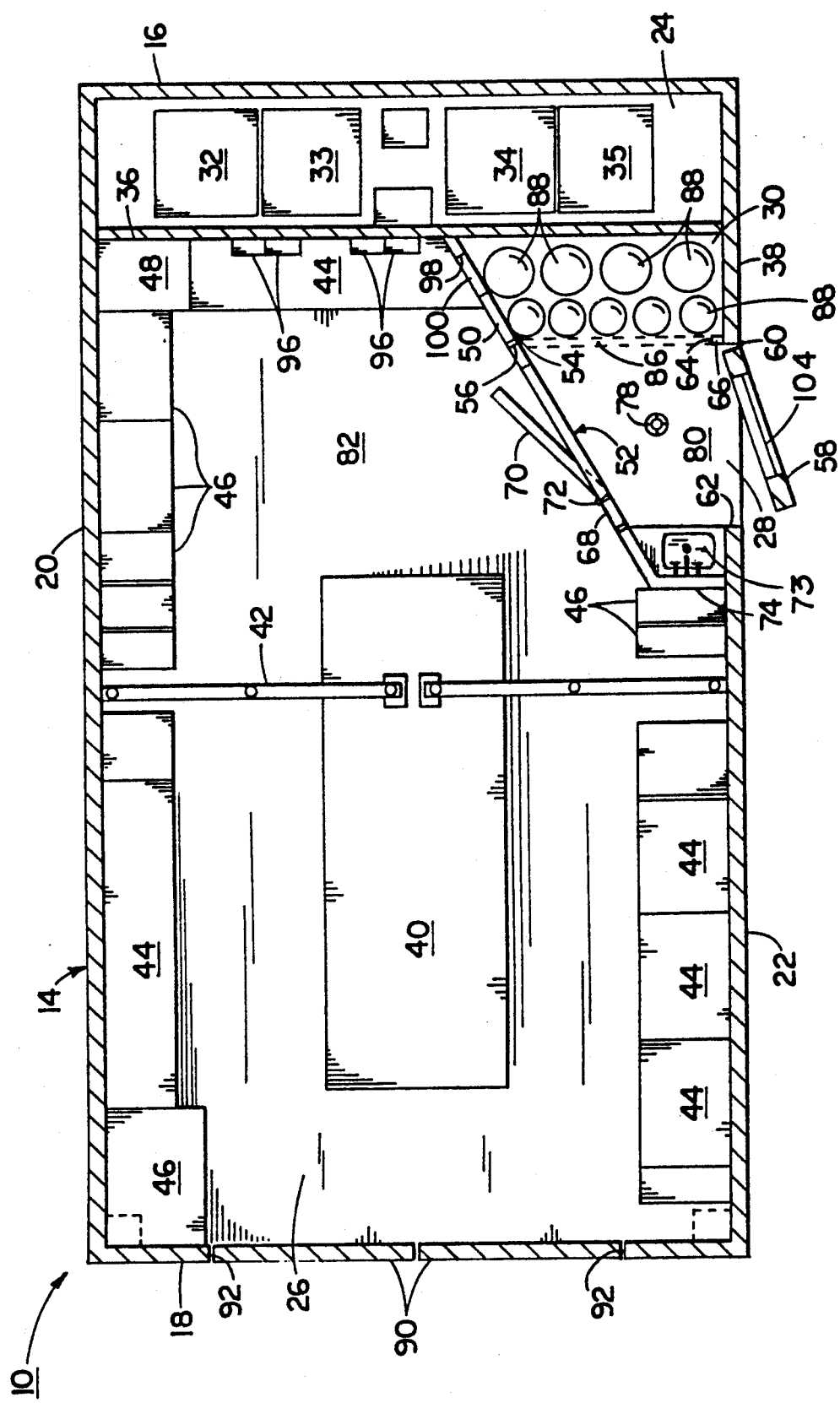
FIG. 2 is a largely schematic cross-sectional plan view of the medical unit showing an interior door to a treatment space in a first position for controlling a passageway between an entryway compartment and a treatment space.
Figure 3:
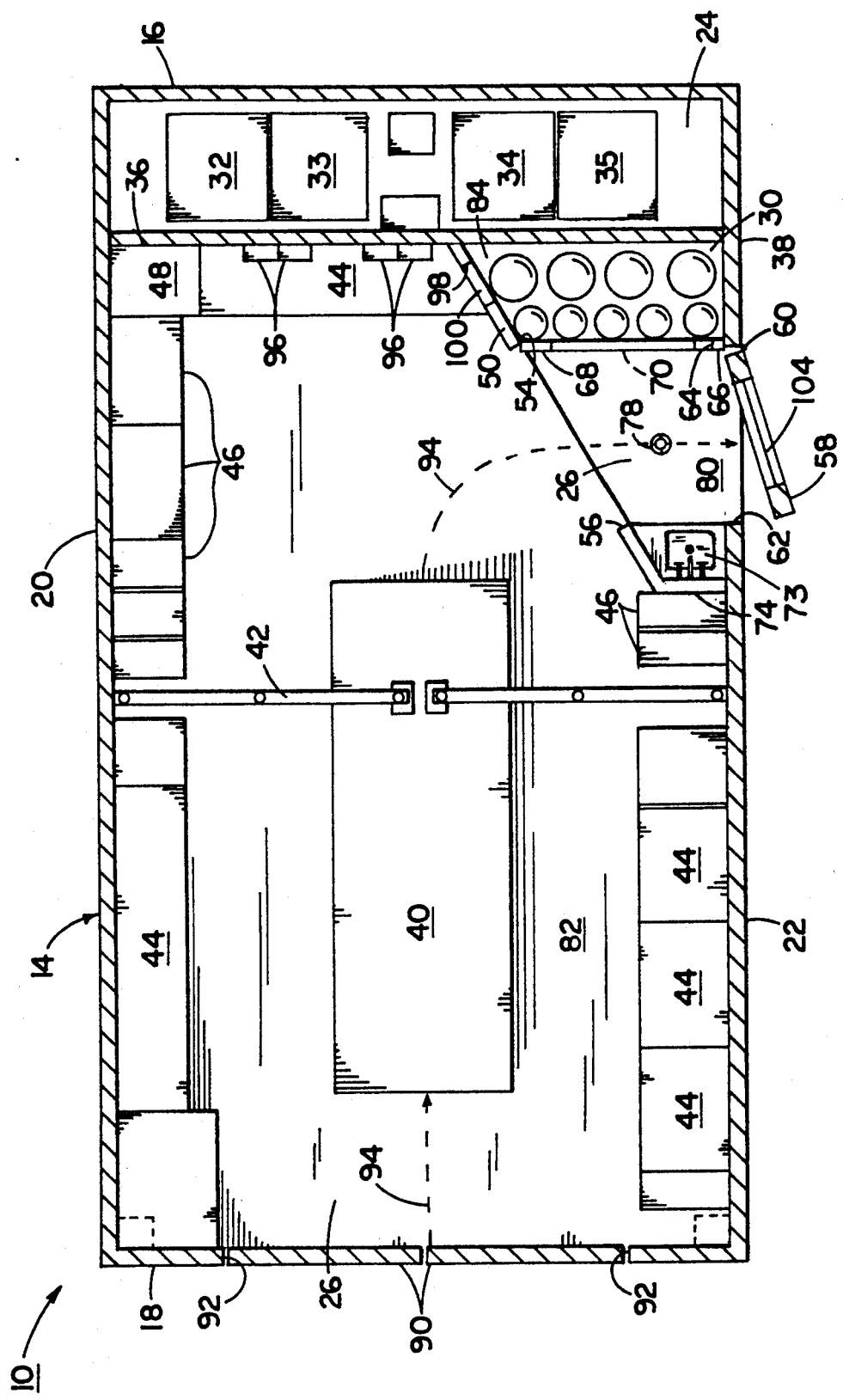
FIG. 3 is a similar schematic floor plan showing the interior door in a second position for closing a storage closet off from the entryway compartment.
Figure 4:
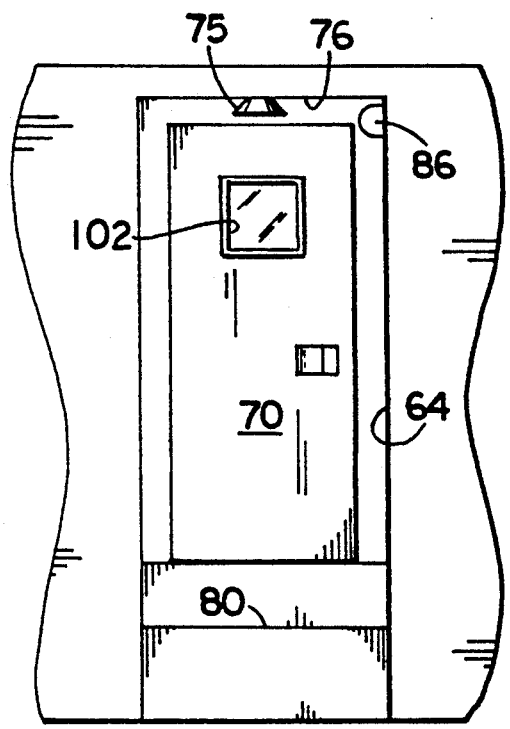
FIG. 4 is an cut-away side view of the unit with the exterior side door removed to expose the entryway compartment equipped as a decontamination site.

The interior door 52 can be swung on hinges 54 between two positions illustrated respectively by FIGS. 2 and 3. In a first position depicted by FIG. 2, the interior door 52 controls a passageway between the treatment compartment 26 and the entryway compartment 28. In the second position depicted by FIG. 3, the interior door 52 closes an opening 64 within a partition 66 separating the entryway compartment 28 from the storage compartment 30. However, in either position, the interior door isolates the treatment compartment 26 from the storage compartment 30.

Preferably, the interior door 52 is made as a double-acting door comprising a main door leaf 68 within which a door hatch 70 is carried on hinges 72. When the double-acting door 52 is swung to the first position, the main door leaf 68 is closed within the interior doorway 56, and ordinary passage of persons between the treatment compartment 26 and entryway compartment 28 takes place through the door hatch 70. The hinges 72 of door hatch 70 are positioned opposite to the hinges 54 on which the main door leaf 68 is mounted. This enables the door hatch 70 to open in a manner that directs traffic into the treatment compartment along the partition 36 and away from the area occupied by gurney 40.

Both the main door leaf 68 and the door hatch 70 form respective airtight seals between the treatment space 26 and entryway compartment 28. One of the air-handling units 34 is operated to produce a "positive" air pressure in the treatment compartment with respect to the entryway compartment. The additional pressure in the treatment compartment complements the airtight seals of the double-acting door 52 to prevent any airborne contaminants from entering the treatment compartment.

The exterior door 58 can also be sealed within the doorway 62 to isolate the entryway compartment from the space outside of the unit. Thus, between the double-acting door 52 and the exterior door 58, the entryway compartment functions as an air lock. The other air-handling unit 35 can be used to remove airborne contaminants from the air lock before admitting persons into the treatment space through the door hatch 70. The air lock, together with the air-handling unit 35, helps to maintain an aseptic attitude within the treatment compartment against contaminants that enter the entryway compartment 28 during replenishment of supplies in the storage compartment 30 or during routine exchanges of patients and medical personnel between the treatment compartment 26 and the space outside of the unit.

In addition to removing airborne contaminants, the air lock space of the entryway compartment can also be used for washing contaminants from persons and supplies. For example, a sink 73 can be mounted against narrow partition 74. In addition, the entire entryway compartment can be used as a shower stall by mounting a shower head 75 from ceiling 76 and a valve-operated drain 78 in floor 80 of the entryway compartment. A foot-operated flapper valve (not shown) is preferably used to temporarily allow wash water to drain from the compartment while normally sealing the drain to maintain a desired positive air pressure within the compartment with respect to space outside the unit. The floor 80 is also preferably formed as a stepwell that is recessed with respect to floors 82 and 84 of the treatment compartment and the storage compartment, respectively. The stepwell helps to prevent any runoff of wash materials from entering either the treatment or the storage compartments. A pull-down curtain 86 or other temporary closure is used to cover the opening 64 in partition 66 between the entryway compartment and storage compartment to protect contents of the storage compartment from the wash materials.

The partition 50, along with the interior doorway 56, is oriented at an acute angle "B" with respect to the side wall 22. The partition 66 between the entryway compartment 28 and the storage compartment 30 is located opposite to the acute angle B to increase the width of opening 64 and thereby provide better access to supplies stored in the closet including medical gases 88. In fact, the opening 64 may be made of sufficient width to provide access to the gas tanks in a row. The acute angle B also orients the interior doorway 56 partially facing the portion of the treatment space within which the gurney 40 is located. In fact, the main door leaf 68 can be swung about hinges 54 into the second position shown in FIG. 3 to provide an auxiliary exit for recumbent patients carried on the gurney 40 or other conventional litters.

Ordinarily, recumbent patients are carried directly into and out of the treatment compartment 26 through double exterior doors 90 that are mounted in exterior doorway 92 formed in the rear wall 18. Nonetheless, the interior doorway 56 is oriented with respect to the side wall 22 to provide a smooth curved passageway 94 within the limited width of the unit between the exterior doorway 92 in the rear wall 18 and the exterior doorway 62 in the side wall 22 so that recumbent patients can also be carried into the treatment compartment through one exterior doorway and be carried out of the treatment compartment through another exterior doorway along a continuous path. Although the interior doorway 56 is oriented at the acute angle B to the side wall 22, the interior doorway 56 is sufficiently aligned with the exterior doorway 62 to permit simultaneous passage of patients on litters through both doorways along the passageway 94.

The acute angle B at which the partition 50 oriented to the side wall 22 also helps to limit any obstruction in view of the partition 36 within the treatment compartment 26. Accordingly, gauges 96 and other displays located on the partition for monitoring various systems including the power system, air-handling system, and medical gas supply system can be viewed from nearly anywhere within the treatment compartment.

A portion of the partition 50 separates the treatment compartment 26 from the storage compartment 30; and within this portion of the partition 50, a port 98 is formed. The port 98 permits direct access to supplies within the storage compartment, but is mainly intended to provide access to gas shut-off valves within the storage compartment. A small door 100 closes the port 98 and seals the port against ingress of contaminants.

Door hatch 70 and exterior door 58 are fitted with respective windows 102 and 104 to provide views into and out of the entryway compartment. For example, the window 102 permits medical personnel in the treatment space to monitor activities in the entryway compartment. Also, the windows 102 and 104 are sufficiently aligned to permit a view of the space outside of the unit from within the treatment space.

The illustrated medical unit 10 is preferably equipped for surgical operations as a medical field unit capable of rapid deployment by military conveyances. It is envisioned that the unit can be deployable together with a series of similar units to provide a complete hospital facility at remote locations. However, the medical unit can also be used as an ambulance with advanced life-support capabilities or even as a troop carrier having medical protections against chemical and biological contamination.

I claim:

1. An entryway system for a mobile medical unit having interior spaces for treatment of patients and for storage of medical supplies comprising:

an entryway compartment having a floor, a ceiling, and at least three walls;

a first of said walls including an exterior doorway for providing a passageway for persons between said compartment and a space outside of the medical unit;

a second of said walls including an interior doorway for providing a passageway for persons between said compartment and the treatment space inside the medical unit;

said exterior doorway and said interior doorway being sized to permit passage of a patient on a litter through both of said doorways simultaneously;

an interior door hinged to said interior doorway and having a main door leaf within which a door hatch is carried;

said main door leaf being swingable from said interior doorway into said compartment to permit the passage of a patient on a litter between said compartment and the treatment space inside the medical unit;

said door hatch being swingable from said interior doorway into the treatment space to permit passage of persons between said compartment and the treatment space inside the medical unit; and said second wall being inclined through an acute angle with respect to said first wall to position said interior doorway along a smooth curved passageway for moving the patient on a litter between the treatment space and the space outside of the medical unit.

2. The entryway system of claim 1 in which a third of said walls includes an opening for exchanging medical supplied between said compartment and the storage space inside the medical unit.

3. The entryway system of claim 1 in which both said door leaf and said door hatch are made with airtight seals to help maintain an aseptic attitude inside of the treatment space against contaminants that enter said compartment through said exterior doorway during routine exchange of supplies between the storage space and the space outside of the medical unit.

4. The entryway system of claim 3 in which said door leaf and said door hatch seals form an air lock between the treatment space and said compartment, and an air-handling system provides for removing contaminants from said compartment.

5. The entryway system of claim 4 in which said floor of the compartment is lower than a floor of the treatment space further defining the compartment as a stepwell.

6. The entryway system of claim 5 in which said floor of the compartment includes a valve-operated drain as part of a decontamination system.

7. The entryway system of claim 2 in which the storage space inside of the medical unit provides for storing a plurality of tanks containing medical gases, and said opening in the third wall is sized to provide access to the tanks in a row.

8. The entryway system of claim 7 in which said third wall interconnects said first and second walls.

9. The entryway system of claim 8 further comprising a fourth wall that also interconnects said first and second walls and is shorter in length than said third wall.

10. The entryway system of claim 9 in which a sink is mounted against said fourth wall within said compartment.

11. The entryway system of claim 2 in which said main door leaf can be swung between two positions; in one of said positions, said main door leaf closes the passageway between said compartment and the treatment space inside the medical unit, and in the other of said positions, said main door leaf closes the opening between said compartment and the storage space inside the medical unit.

12. The entryway system of claim 11 in which said door hatch is hinged on an opposite side with respect to said main door leaf to help direct traffic flow of persons within the treatment space.

13. A mobile unit having self-contained facilities for providing medical services at remote locations from hospitals comprising:
   a main body divided into a treatment compartment, an entryway compartment, and a storage compartment;
   an exterior doorway providing a passageway for persons between said entryway compartment and a space outside of the mobile unit;
   an interior doorway providing a passageway for persons between said entryway compartment and said treatment compartment;
   an opening connecting said storage compartment to said entryway compartment for replenishing supplies in said storage compartment;
   an interior door hinged to said interior doorway and having a main door leaf within which a door hatch is carried;
   said main door leaf being swingable from said interior doorway into said entryway compartment to permit the passage of a patient on a litter between said entryway compartment and said treatment compartment;
   said door hatch being swingable from said interior doorway into said treatment compartment to permit passage of persons between said entryway compartment and said treatment compartment; and
   said door leaf and said door hatch being made with respective airtight seals to help maintain an aseptic attitude inside of said treatment compartment against contaminants that enter said entryway compartment through said exterior doorway during replenishment of supplies between said storage compartment and the space outside of the mobile unit.

14. The mobile unit of claim 13 in which an air-handling system produces a positive air pressure in said treatment compartment with respect to air pressure in said entryway compartment.

15. The mobile unit of claim 14 in which said air-handling system also provides for removing contaminants from said entryway compartment.

16. The mobile unit of claim 13 in which said interior doorway is oriented at an acute angle to said exterior doorway to form a smooth curved passageway for moving the patient on a litter between said treatment compartment and the space outside of the mobile unit.

17. The mobile unit of claim 16 in which said opening connecting said storage compartment to said entryway compartment is located opposite to said acute angle.

18. The mobile unit of claim 17 in which said storage compartment holds a plurality of tanks containing medical gases, and said opening is sized in width to provide access to the tanks in a row.

19. The mobile unit of claim 13 in which said main door leaf can be swung between two positions; in one of said positions, said main door leaf closes the passageway between said entryway compartment and said treatment compartment, and in the other of said positions, said main door leaf closes said first opening connecting said storage compartment to said entryway compartment.

20. The mobile unit of claim 19 in which said door hatch is hinged on an opposite side with respect to said main door leaf to help direct traffic flow of persons within said treatment compartment.

21. The mobile unit of claim 13 further comprising a port connecting said storage compartment to said treatment compartment for accessing supplies in said storage compartment.

22. The mobile unit of claim 21 in which said port is closed by a door.

23. A medical field unit capable of rapid deployment by both land and air conveyances for administering self-contained medical services at remote locations comprising:
   a main body sized for transport on roads having a front, a rear, and two sides;
   a treatment compartment within the main body for administering medical services to patients;
   a rear doorway enclosing a rear door for admitting patients on litters into said treatment compartment from a space outside of the field unit;
   an entryway compartment sized to admit medical personnel and ambulatory patients for decontamination prior to entry into said treatment compartment;
   a side doorway enclosing a side door for admitting medical personnel and patients into said entryway compartment from the space outside of the field unit;
   an interior doorway within an interior wall enclosing an interior door for admitting medical personnel and patients into the treatment space from said entryway compartment,
   said interior wall being inclined through an angle with respect to said side doorway to provide an auxiliary exit for patients on litters along a smooth curved passageway connecting said side doorway with said rear doorway.

24. The field unit of claim 23 further comprising an air-handling system for developing a positive pressure in said treatment compartment with respect to said entryway compartment.

25. The field unit of claim 24 in which said air-handling system also provides for removing contaminants from said entryway compartment.

26. The field unit of claim 25 in which said entryway compartment and said treatment compartment include respective floors, and said floor of the entryway compartment is lower than said floor of the treatment compartment, further defining said entryway compartment as a stepwell.

27. The field unit of claim 23 further comprising a storage compartment accessible through an opening to said entryway compartment.

28. The field unit of claim 27 in which said storage compartment provides space for a plurality of tanks containing medical gases, and said opening is sized to provide access to the tanks in a row.

29. The field unit of claim 27 in which said interior door is a double-acting door having a main door leaf within which a door hatch is carried, said main door leaf being swingable from said interior doorway into said entryway compartment and said door hatch being swingable from said interior doorway into said treatment compartment.

30. The field unit of claim 29 in which said double-acting door may be swung between two positions; in one of said positions, said double-acting door closes a passageway for admitting medical personnel and patients into the treatment space from said entryway compartment, and in the other of said positions, said double-acting door closes said opening to the entryway compartment from said storage compartment.

31. The field unit of claim 30 in which said door hatch can be opened into said treatment compartment when said double-acting door is swung to said one position to admit medical personnel and patients into said treatment compartment from said entryway compartment.

* * * * *